E. MESCHINI.
BREAD MIXING MACHINE.
APPLICATION FILED NOV. 20, 1907.
936,920.
Patented Oct. 12, 1909.
2 SHEETS—SHEET 1.
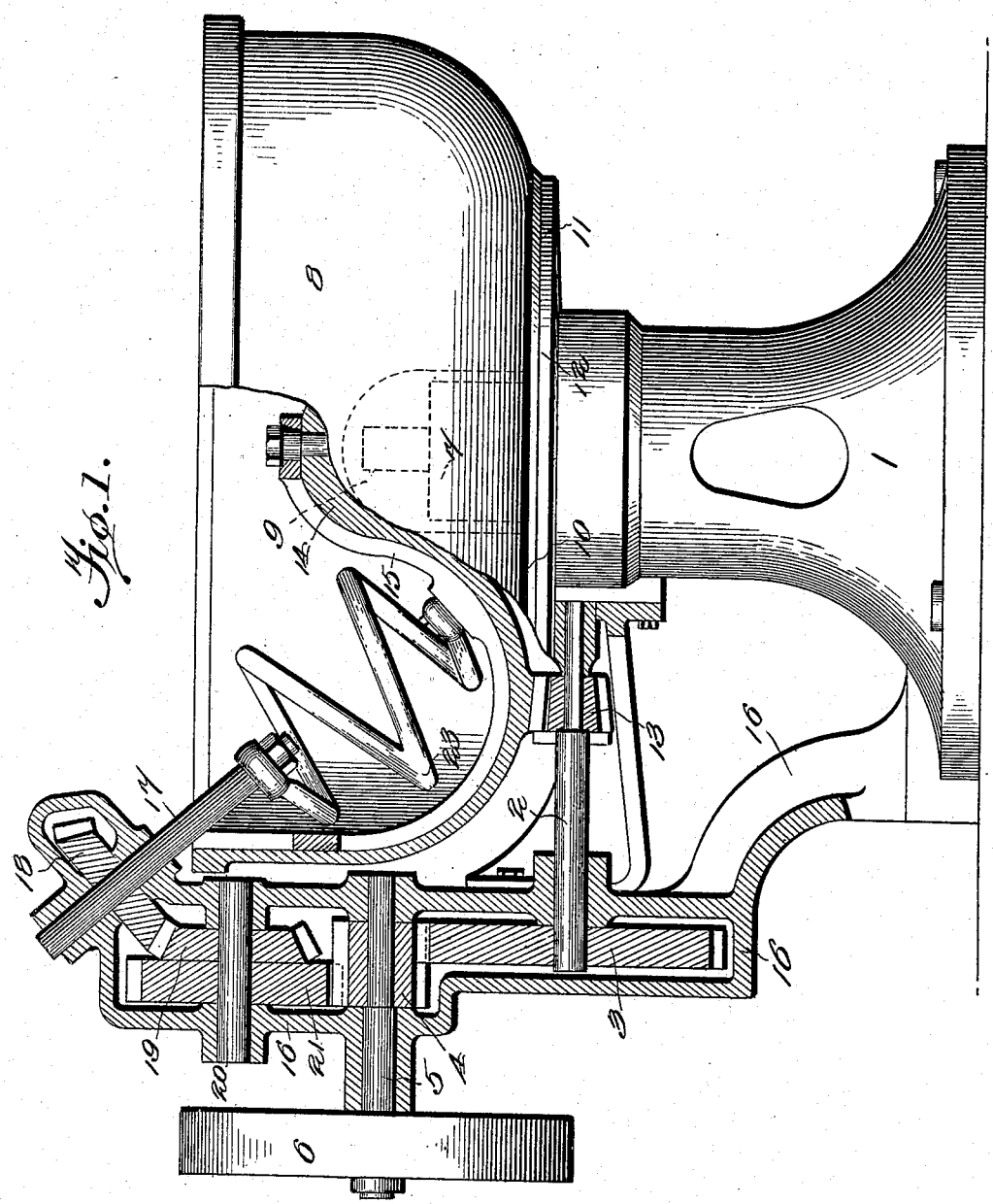

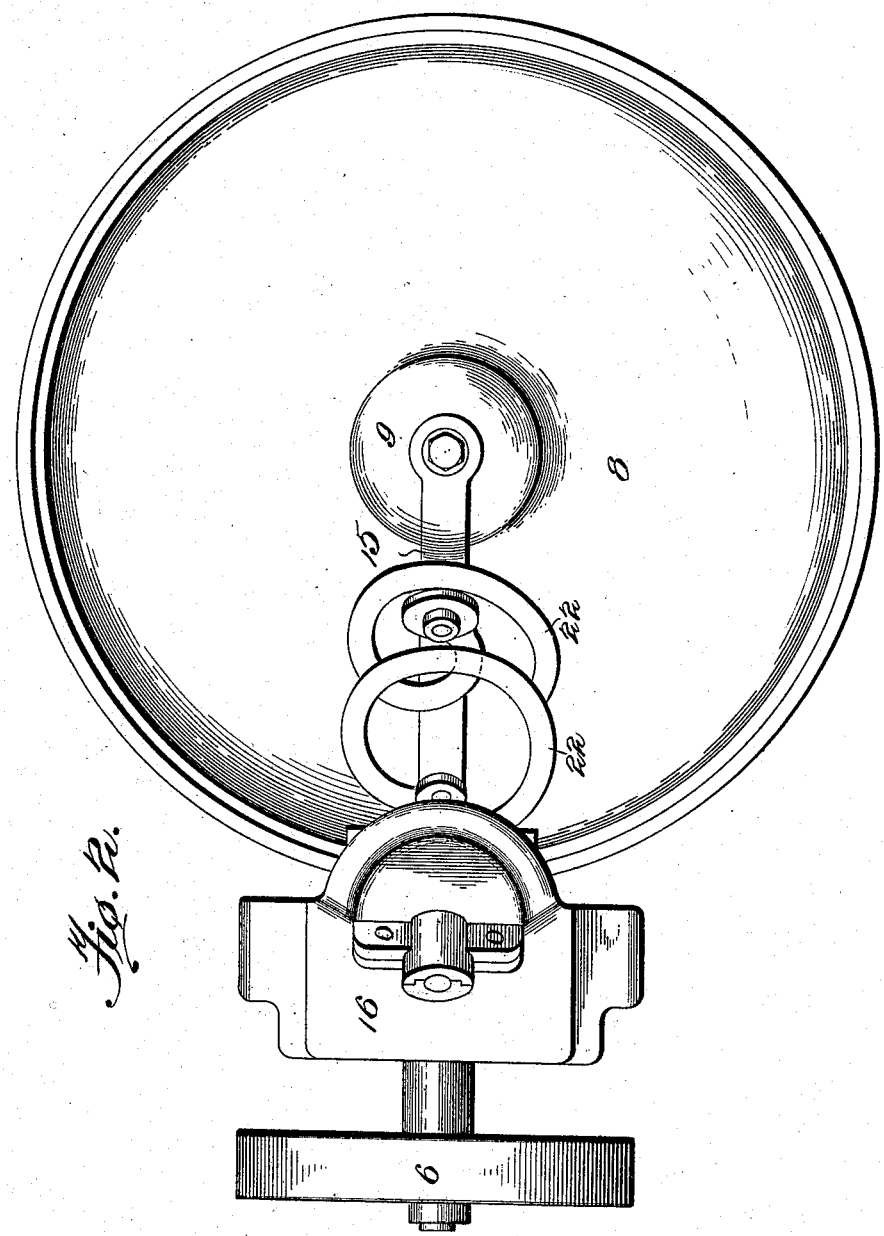

UNITED STATES PATENT OFFICE.

EUGENIO MESCHINI, OF GALLARATE, ITALY, ASSIGNOR TO THE FIRM OF EUGENIO MESCHINI, OF GALLARATE, ITALY.

BREAD-MIXING MACHINE.

936,920.      Specification of Letters Patent.      Patented Oct. 12, 1909.

Application filed November 20, 1907. Serial No. 403,088.

*To all whom it may concern:*

Be it known that I, EUGENIO MESCHINI, a subject of the King of Italy, residing at Gallarate, Italy, have invented certain new and useful Improvements in Bread-Mixing Machines; and I do hereby declare the following to be a full, clear, and exact description of the invention, such as will enable others skilled in the art to which it appertains to make and use the same.

My invention relates to improvements in bread mixing machines, and the object of my invention is to produce a simple machine for effectually mixing or kneading dough in which all the gearing and driving parts are located outside of the basin or vessel which contains the dough, thus preventing them from rusting on account of the salt contained in the dough and preventing the lubricating material from getting mixed with the dough.

With this object in view my invention consists in the construction and combinations of parts as hereinafter described and claimed.

In the accompanying drawings—Figure 1 is a side elevation, partly in section, of the complete machine. Fig. 2 is an end view of a half of the machine.

1 represents the extended base support of the machine, provided on one side with a bearing in which is mounted the shaft 2 for driving the basin. Attached to the base is an outwardly and upwardly extending bracket 16 which carries the driving gear. On the outer end of the shaft 2 is mounted a spur wheel 3 which meshes with a long pinion 4 on the driving shaft 5, on which shaft is mounted the driving pulley 6 to which power is applied by any suitable means. The pinion 4 also engages with the spur gear wheel 21 fixedly mounted on the shaft 20, which shaft is loosely mounted in bearings in the part 16. To the shaft 20 is also fixed a beveled gear wheel 19 which meshes with the similarly shaped gear wheel 18 fastened to the shaft 17. All the shafts and gear wheels mentioned are, as shown in the drawing, mounted wholly or partly in the part 16 and are, with the exception of a part of the shaft 17, located wholly outside of the basin 8.

The base or support 1 is provided with a flattened portion 10 from which upwardly projects a large shaft 7, which at its top is provided with a smaller upwardly projecting shaft. The basin is adapted to fit over the support and upon the projecting portions just described. This basin is provided with a projecting portion 11 and with a hemispherical dome 14 having a cut-away portion 9 fitting over the part 7. Thus the basin is mounted on the part 7 as a pivot and rests upon the part 10 of the base. The basin is provided with an annular gear wheel 12 which meshes with a pinion 13 on the shaft 2, by means of which, and the gearing already described, the basin is revolved when the machine is in use.

Loosely mounted on a screw in the top of the dome-shaped portion 14 is mounted one end of the bar 15, curved to substantially conform to the inner curve of the basin 8. This curved bar forms a bearing for one end of the peculiarly shaped stirring device, the other end being fastened to the shaft 17. This stirring device is composed of two branches 21 and 22, each made in a spiral and one projecting from the shaft 17, and the other from the bearing in the bar 15. These two spirals 21 and 22, are, however, twisted in opposite directions, and at their point of meeting form a sharp spur 23.

By the arrangement shown all the driving gear is located outside of the basin, thus preserving it from rust on account of the salt in the dough, and on account of the arrangement shown the dough in the basin is kept absolutely free from the lubricating material employed to make the basin run more easily.

While I have thus described my invention, I do not limit myself to the exact construction shown and described, as this might be varied in many details without departing from the spirit of my invention. For example, friction reducing devices, like balls in a race-way, could be employed at the point of support 10. The shaft 17 might be driven by a sprocket wheel and chain from the shaft 5, and many other changes will occur to those skilled in the art.

I claim:—

1. In a bread mixing machine, the combination of a base provided with a pivot pin, a basin having a central cut away portion in its bottom adapted to rest upon said base, said basin being provided with a continuous, uninterrupted inner surface, a fixed bar having one end pivotally connected to and located in said basin, an inclined stirrer, one end of which is pivotally mounted in said bar, a shaft to which the other end of said stirrer is connected, said shaft projecting upwardly outside of the basin, and means for rotating said shaft and said basin, substantially as described.

2. In a bread mixing machine, the combination of a basin having a continuous, uninterrupted interior, a suitable support on which said basin is mounted and adapted to revolve, a bar fixed in said basin and having one end pivotally connected to the center of said basin, a stirrer located in an inclined position in said basin and having one end supported in said bar, a shaft connected to the other end of said stirrer, said shaft projecting upwardly outside of said basin, and means for revolving said shaft and said basin, substantially as described.

3. In a bread mixing machine, the combination of a suitable support provided with a pivot pin on its top, a basin having a continuous interior, said basin having an upraised central portion provided with a cut away portion adapted to fit over said pin, a fixed bar in said basin having its inner end pivotally mounted in the center of said basin, a stirrer located in an inclined position in said basin and having one end supported in said fixed bar, a shaft supporting the other end of said stirrer and extending upwardly in an inclined position outside of said basin, a driving shaft, and connections leading from said driving shaft to the stirrer shaft and basin, whereby said stirrer shaft and basin may be continuously revolved, substantially as described.

In testimony whereof, I affix my signature, in presence of two witnesses.

EUGENIO MESCHINI.

Witnesses:
OSVALDO BELLANTA,
M. DIENDORFER, Jr.